Dec. 28, 1926.
E. A. NELSON
1,612,145
COMBINATION DISK AND WIRE WHEEL
Filed April 3, 1925
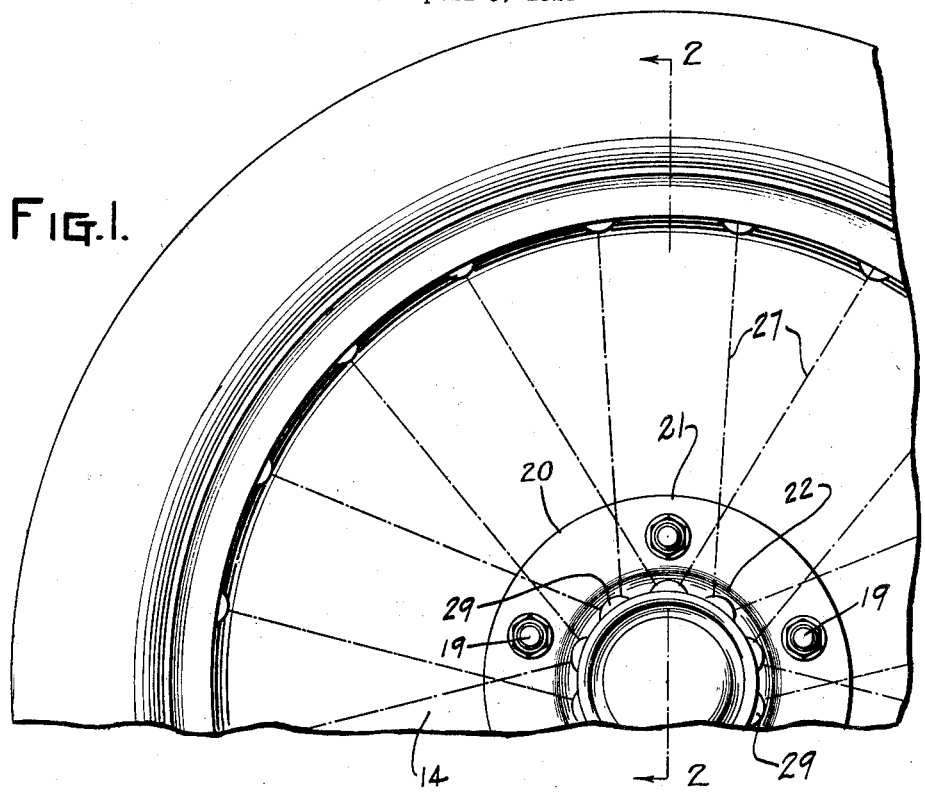
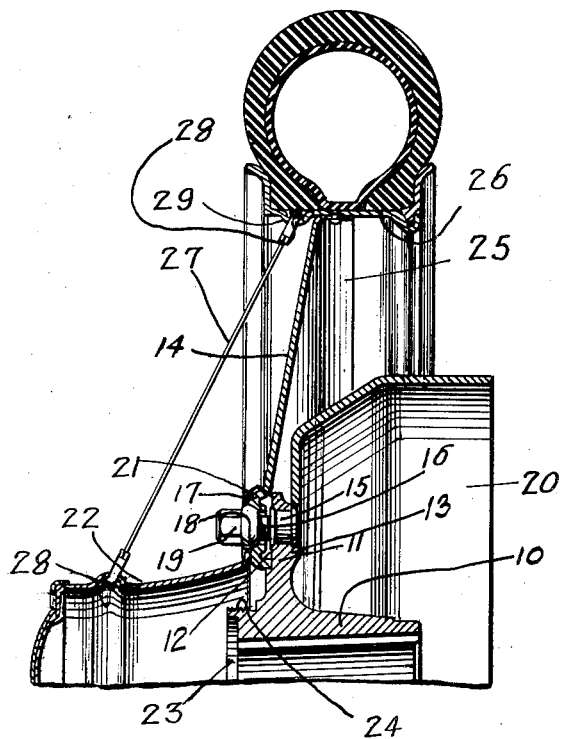
INVENTOR.
EMIL A. NELSON.
BY
ATTORNEY.

Patented Dec. 28, 1926.

1,612,145

UNITED STATES PATENT OFFICE.

EMIL A. NELSON, OF ABINGTON, PENNSYLVANIA, ASSIGNOR TO BUDD WHEEL COMPANY, OF PHILADELPHIA, PENNSYLVANIA, A CORPORATION OF PENNSYLVANIA.

COMBINATION DISK AND WIRE WHEEL.

Application filed April 3, 1925. Serial No. 20,319.

My invention relates to a combination wheel in which the wheel structure is comprised of a combination of the well known disk wheel structure and the well known wire wheel structure. It has features which are without doubt related to combination structures of other forms but which may be devised to derive the same results in substantially the same way.

The prime object of my invention is to produce an extremely light wheel. A secondary object is to produce a wheel, which, while light, possesses sufficient resiliency to insure easy running and yet is stiffened and strengthened against lateral distortion. A tertiary object is to produce a wheel of an improved ornamental appearance. There are yet other and perhaps subordinate objects such for example as the achievement of these objects through the utilization in as great a measure as possible of standard parts of standard disk and wire wheels.

In the accompanying drawing I show the preferred form of my invention:

Of the drawings—

Figure 1 is a side elevation of a wheel constructed according to my invention, portions of the structure being broken away to reduce the space required for the view.

Fig. 2 is a vertical transverse section on the line 2—2 of Fig. 1.

A general survey of the drawings will show that I achieve the object of my invention by bracing a wheel body disk, (by which is meant a disk having a supporting function for the peripheral portions of the wheel as for example the rim and the tire, etc.,) by means of a wheel body system of wire spokes. Both of these devices are arranged commonly upon a standard hub, the body disk being anchored directly thereto by the usual studs, and the system of body spokes being anchored to a hub cap founded upon the hub structure through the intermediary of the body disk and its anchoring means.

Specifically, 10 is the hub. It is provided with a radially extending flange 11 having an outer disk mounting face 12 terminating inwardly in a centering shoulder 13. A wheel body disk 14 is mounted thereon by means of securing studs 15. The studs 15 are arranged in the flange 11 in an annular series, being anchored therein in any well known manner, and are provided with outwardly projecting heads 16. The body disk 14 is provided with an annular boss 17 the borders of which bear upon the mounting face 12. This boss 17 is in turn provided with an annular series of concave nut sockets 18 surrounding the studs, but not touching the mounting face 12. Conical nuts 19 bearing in the sockets 18 secure the body disk 14 firmly in place.

Within the body disk and riveted to the hub flange independently of the body disk 14 is a brake drum 20 of usual construction.

Without the body disk and founded by means of flange 21 upon the boss 17 of the body disk is a hub cap 22 projecting laterally beyond the exterior end 23 of the hub. Usually such hub caps are threaded on the exterior end of the hub, engaging threads 24 provided for this purpose on the standard hub. In this case, however, the hub cap flange 21 is provided with an inturned edge neatly fitting over the inturning of the boss 17 where it joins the body 14. This centers and aligns the hub cap upon the disk 14.

The body disk 14 is provided with a peripheral flange 25 and through this flange mounts a wheel rim of any of the usual constructions, the rim being welded or riveted thereto.

Anchored to the hub cap 22 and also to the rim 26 exteriorly of the zone of the rim flange 25 in this instance is a system of spokes 27. The opposite ends of these spokes are anchored by spherical nuts 28 in the complementally formed depressions 29 in the wheel rim 26 and the hub cap 22 respectively. When the nuts 28 are tightened up, the system of spokes 27 not only braces the whole structure at large but assists the body disk 14 in supporting the load passed to it through the rim.

The body disk 14 is of conical cross section presenting inwardly of the wheel structure, and the spokes 27 are in a conical arrangement exteriorly thereof and presenting in the same direction. They thus, while possessed of a reasonable degree of flexibility or resiliency, brace the body disk 14 against undue conical distortion. Thus, the wheel body disk may itself be made considerably lighter than under the usual conditions. In fact, the body disk 14 and the spokes 27 mutually inter-brace each other, each set of radial elements of the structure constituting a truss against lateral distortion of the wheel either from direct application of the load or undue lateral strains imposed by irregularities in the road-way or by any encountered obstacle.

The appearance of this wheel is highly ornamental, a series of spokes constituting a distinct ornamentation in combination with the outwardly convex surface of the body disk 14.

And withal the entire structure is accomplished by an adaption in the main of elements commonly used in standard equipment of disk and wire wheel structures. The additions are the introduction of a new hub cap founded on the boss of the body disk and aligned by it and the securing nuts 19, and the provision of the spoke sockets 29 in the hub cap and rim respectively.

What I claim is:—

1. A vehicle wheel structure comprising a wheel hub, a wheel disk carried by said hub, a hub cap, and a system of wire spokes bracing said wheel disks and anchored to said hub cap.

2. A vehicle wheel structure comprising a hub and a hub cap, and a bipartite wheel body one part of which is anchored directly to said hub and the other part of which is anchored directly to said hub cap.

3. A vehicle wheel structure comprising a hub having a radial flange, a wheel body disk mounted on said flange, securing means therefor, a hub cap aligned by said securing means, and a system of wheel body spokes anchored to said hub cap and assisting the body disk in the support of the wheel.

4. A vehicle wheel structure comprising a wheel body disk having a central hub boss, a hub cap centered on said boss, and an exterior system of wire body spokes anchored in said hub cap.

5. A vehicle wheel structure comprising a wheel hub, a wheel disk carried by said hub and having an annular rim supporting flange, a rim on said flange, and a set of spokes extending from said rim on the side thereof opposite to the direction of projection of said flange from said disk, and said spokes at their axial end being anchored to a projecting part extending axially from and rigid with respect to said hub.

6. A vehicle wheel structure comprising a wheel hub, a wheel disk carried by said hub and having an outer annular rim supporting flange, a rim on said flange, a hub cap centered with respect to said disk and rigid with respect thereto, and a set of spokes extending from said rim on that side thereof opposite to the direction of projecting of said flange from said disk, and said spokes at their axial end being anchored to said hub cap.

In testimony whereof I hereunto affix my signature.

EMIL A. NELSON.